United States Patent
Komagata (10) Patent No.: US 7,531,765 B2
(45) Date of Patent: May 12, 2009

(54) GLASS KEY TOP, KEY TOP MARKING METHOD, AND METHOD FOR MANUFACTURING KEY UNIT USING THE SAME

(75) Inventor: Katsuya Komagata, Tokyo (JP)

(73) Assignee: Sunarrow Ltd., Chuo-ku, Tokyo (JP)

( * ) Notice: Subject to any disclaimer, the term of this patent is extended or adjusted under 35 U.S.C. 154(b) by 625 days.

(21) Appl. No.: 10/541,659

(22) PCT Filed: Nov. 27, 2003

(86) PCT No.: PCT/JP03/15175
§ 371 (c)(1), (2), (4) Date: Mar. 13, 2006

(87) PCT Pub. No.: WO2004/068328
PCT Pub. Date: Aug. 12, 2004

(65) Prior Publication Data
US 2006/0258387 A1    Nov. 16, 2006

(30) Foreign Application Priority Data
Jan. 30, 2003   (JP)   ............... 2003-021274

(51) Int. Cl.
    H01H 13/83   (2006.01)
(52) U.S. Cl. ........................ 200/314; 29/622
(58) Field of Classification Search ......... 200/308–316; 341/22, 28; 345/156, 168–170, 173; 29/622
See application file for complete search history.

(56) References Cited

U.S. PATENT DOCUMENTS

| | | | | |
|---|---|---|---|---|
| 5,231,380 A | * | 7/1993 | Logan | 345/156 |
| 6,623,660 B1 | * | 9/2003 | Kimura | 252/299.01 |
| 6,924,789 B2 | * | 8/2005 | Bick | 345/168 |
| 7,087,847 B2 | * | 8/2006 | Parkinson et al. | 200/5 A |
| 7,134,205 B2 | * | 11/2006 | Bruennel | 29/896.5 |
| 7,180,022 B1 | * | 2/2007 | Chiu | 200/313 |
| 7,319,426 B2 | * | 1/2008 | Garfio | 341/176 |
| 7,429,979 B2 | * | 9/2008 | Mears et al. | 345/172 |

FOREIGN PATENT DOCUMENTS

| | | |
|---|---|---|
| JP | 10-106379 | 4/1998 |
| JP | 10-149739 | 6/1998 |
| JP | 10-291840 | 11/1998 |
| JP | 11-156568 | 6/1999 |

OTHER PUBLICATIONS

Translation of Mexican Office Action of Feb. 6, 2008.

* cited by examiner

*Primary Examiner*—Michael A Friedhofer
(74) *Attorney, Agent, or Firm*—James V. Costigan; Hedman & Costigan, P.C.

(57) ABSTRACT

There are provided a glass key having a character or symbol marked in an enduring state and a marking method for creating such a glass key. A glass key has a character or a symbol marked on the surface or in the glass medium of the key top. A laser beam belonging to an infrared band having a wavelength of about 1100 nm or below, visible light band, or ultraviolet light band is intermittently applied while focused on the surface of the transparent glass key top or inside of the key top including the upper position, intermediate position, lower position, or other desired position, so that a plenty of fine cracks are formed as a set to represent a character or a symbol.

6 Claims, 10 Drawing Sheets

Configuration of 2-time Higher Harmonics Oscillation Solid-state Laser using Nonlinear Crystal (Output of a green color 0.53 μm)

GLASS KEY TOP, KEY TOP MARKING METHOD, AND METHOD FOR MANUFACTURING KEY UNIT USING THE SAME

TECHNICAL FIELD

The invention relates to a method for marking each key in a key unit for a mobile equipment such as a mobile phone, a portable digital assistant device (PDA) and so forth with a character or symbol, a key top having a character or symbol marked by this marking method, and a method for manufacturing a key unit using this marking method.

BACKGROUND ART

A key unit is a kind of parts composing a mobile equipment such as a mobile phone, a portable digital assistant device (PDA) and so forth wherein many switch operation keys (push buttons) are assembled and arranged on a piece of sheet. A key is composed of a key top made of hard resin or the like, and a keypad made of soft rubber such as silicone rubber, or thermoplastic-elastomer. The key top is installed on the surface of the keypad, and a switch pressing projection (what is called a "plunger") is formed on the plane (reverse side) opposite to the plane of the side of the keypad where the key top is installed. A space between each key is connected by the keypad. If a printed circuit board having switch elements is placed on the undersurface of the key unit being composed this way, a key switch may be formed in the position corresponding to each key.

Characters or symbols indicating the function of each key are drawn on the key top. Such process for drawing characters or symbols on the key is called as "marking". Since each of these keys is arranged in the most noticeable place in the target mobile equipment, the particular attention is paid to the design and arrangement thereof. Particularly, durability and high-class impression are important elements. Although a transparent glass key top has never been utilized for a mobile equipment such as a mobile phone and so forth in the past, it seems that the transparent glass key will possibly become an important candidate to be utilized for a mobile equipment hereafter from the above-mentioned viewpoint.

However, a transparent glass key top (hereinafter referred to as a "glass key") has a problem to be solved. The problem relates to a difficulty in marking on the glass key. Of course, it can be considered to form a character or symbol on a surface of a glass key by printing or painting, however, it is not easy to assign wear resistance to the character or symbol printed on a hard and smooth glass surface.

There is an example of having tried to solve the above-mentioned problem (e.g., refer to the patent document 1). According to this example, a character and so forth are engraved by removing the fine cracks formed on the glass surface due to the sudden change of the temperature at the irradiated spot resulting from irradiation of carbon dioxide laser to a glass surface.

Patent document 1:

Unexamined patent publication No. Hei 10-291840 The object of the patent document 1 is not the same as a glass key as claimed in the invention.

DISCLOSURE OF THE INVENTION

The problem to be solved in the invention is to provide a glass key which is marked with a character or symbol in the mode of endurance, and to propose a marking method for manufacturing such a glass key.

The above-mentioned problem for providing a glass key which is marked with a character or symbol in the mode of endurance can be solved by the invention described in claim 1. That is, there is provided a glass key which is marked with a character or symbol on the surface of the key top and/or inside of the glass medium.

In the glass key according to the invention as claimed in claim 1, a character or symbol is in the state of being engraved directly to the glass medium and/or in the state of being blocked from contact or friction from the outside. Therefore, a perfect wear resistance can be obtained. Moreover, in case that a character or symbol is marked within the glass medium, a fresh visual effect can be obtained since the character or symbol is seen with lens effect in the state that the character or symbol floats in the glass medium. Further, the fine cracks are not soiled with hands and thereby do not become unsanitary.

The marking method in the above-mentioned problem can be solved by the invention claimed in claim 3. That is, such a method is that a laser light belonging to the near-infrared band having a wavelength of about 1100 nm or below, visible light band or ultraviolet light band is intermittently irradiated while focused on the surface of the transparent glass key top, or the position adjacent to the surface inside the key top including the upper position, intermediate position, lower position or other desired position, so that plenty of fine cracks are formed as a two-dimensional or three-dimensional set on the glass medium, to thereby represent a character or symbol.

There are two key reasons why a laser light having a wavelength of about 1100 nm or below is adopted in the above-mentioned marking method. The first reason is that the shorter the wavelength of the laser light is, the higher relatively the energy of the laser light is, if the amplitude of the wavelength is identical. The second reason is that since in a short wavelength near-infrared light, visible light and ultraviolet light, a spot diameter of 30 µm or below can be easily obtained by lens condensing, these near-infrared light, visible light and ultraviolet light are suitable for forming fine cracks on a glass medium. For example, in the case where a carbon dioxide laser belonging to an infrared band wherein a wavelength is long such as about 10.6 µm compared to a YAG laser is used instead, it was impossible to satisfactorily process because the cracks could not be formed in the glass medium due to insufficient reduction of the spot diameter, or because the glass key itself was broken due to abrupt temperature rise when the injection power was forced to be increased.

During the marking process, a laser light is focused on a desired position in the glass medium where a character or symbol should be marked. When the light energy is taken into the focal point in a pulse pattern, abrupt temperature change comes out at the tiny point and fine cracks are formed. Since the cracks reflect light diffusely, the cracks can be observed as a microscopic luminescent spot. The focal point is displaced in the plain or in the three-dimensions according to the design of a character or symbol by an optical system having a reflection mirror system (galvanometer scanner) controlled by a computer, so that a set of fine cracks (namely, luminescent spots) representing the concerned character or symbol can be formed along the trajectory of the focal point.

BEST MODE FOR CARRYING OUT THE INVENTION

The First Mode:

As for the above-mentioned laser light, this mode utilizes a laser light having a 532 nm wavelength obtained by converting to the semi-wavelength from the fundamental wave of 1064 nm wavelength of a Nd: YAG laser (Neodymiumion-doped Yttrium-Aluminum-Garnet solid-state laser). The conversion to the semi-wavelength is realized by extracting the second higher harmonics of the Nd: YAG laser. A laser apparatus configured that way is called as a "2-time wave YAG laser" and is also called as a "green laser" since the laser light of 532 nm wavelength emitted therefrom represents a green color.

Besides, it is also possible to utilize the Nd: YAG laser holding the state of the 1064 nm wavelength fundamental wave instead of converting to the semi-wavelength. In this case, it is required to narrow the spot diameter of the laser light to 30 μm or below in the optical system in order to get a sufficient power needed for manufacturing.

The Second Mode:

As for the above-mentioned laser light, this mode utilizes a near-ultraviolet light of 355 nm wavelength obtained by extracting the third higher harmonics of the Nd: YAG laser. This Nd:YAG laser which extracts the third higher harmonics is called as a "3-time wave YAG laser".

The Third Mode:

A laser apparatus is not necessarily limited to the YAG laser. If a sufficient power needed for manufacturing can be obtained, a glass laser, solid-state lasers such as a $YV_4$ laser, an excimer laser, a semiconductor laser and so forth may be used. Further, the higher harmonics of the YAG laser are not necessarily limited to the second or the third higher harmonics. If there is no problem in its efficiency, the forth harmonics or more higher harmonics may be used.

EMBODIMENT OF THE INVENTION

A description of a preferred embodiment in the present invention will be provided with reference to the accompanying drawings.

The reference mark 10 illustrates a key unit, reference mark 11 illustrates a keypad, reference mark 12 illustrates a key top, reference mark 14 illustrates a laser light, reference mark 15 illustrates a character or symbol, and reference mark 16 illustrates fine cracks, respectively.

Figure 1:
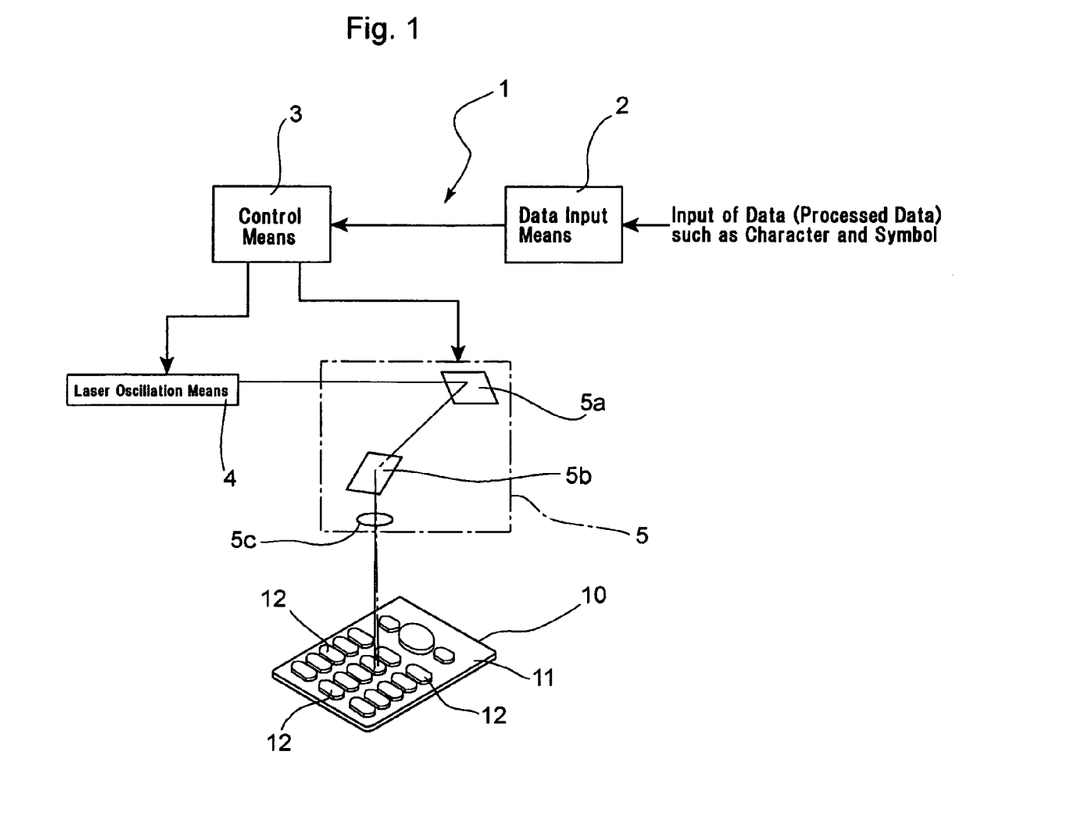
FIG. 1 is a view illustrating roughly the configuration of the laser irradiation apparatus used in the invention.
Figure 2:
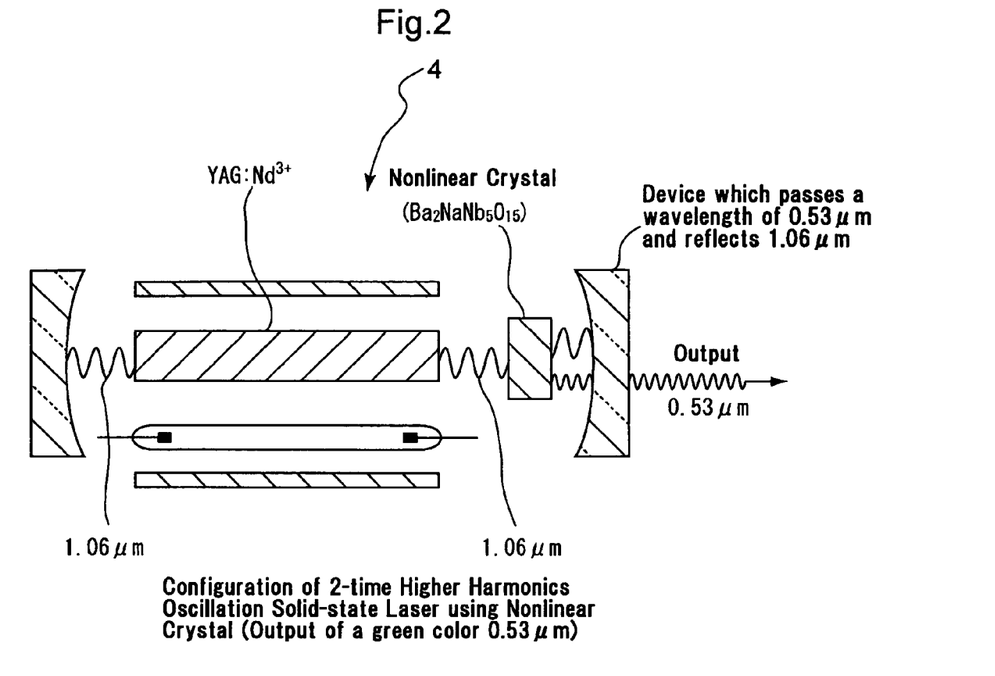
FIG. 2 is a conceptual view illustrating the configuration of a 2-time wave YAG laser.

At first, a description is provided about a laser irradiation apparatus used in the invention. FIGS. 1 and 2 are conceptual views illustrating the configuration of a laser irradiation apparatus 1 used in the invention. The laser irradiation apparatus 1 is composed of a data input means 2, a control means 3, a laser oscillation means 4, an optical system 5 including a plurality of mirrors, lenses and so forth.

The data input means 2 functions for inputting data (three-dimensional data) regarding the pattern of a character or symbol, and for storing the inputted data. The data to be inputted is inputted in the form of e.g., CAD data and so forth created by a computer. The control means 3 generates, based on the data inputted from the data input means 2, three-dimensional process data to be used for the actual manufacturing process by controlling the laser oscillation means 4 and the operation of the optical system 5.

The laser oscillation means 4, in this embodiment, emits e.g., light of 532 nm wavelength obtained by converting to the semi-wavelength from the 1064 nm wavelength fundamental wave of the Nd:YAG laser as laser light. This conversion to the semi-wavelength is realized by extracting the second higher harmonics of the Nd: YAG laser. A laser thus configured is called as a "2-time wave YAG laser". Since the laser light of 532 nm wavelength emitted therefrom represents a green color, it is also called as "green laser". FIG. 2 is a conceptual view illustrating a configuration example of the laser oscillation means 4 as for the 2-time wave YAG laser.

Besides, as for the above-mentioned laser light, it is also possible to utilize a near-ultraviolet light of 355 nm wavelength obtained by extracting the third higher harmonics of the Nd: YAG laser. The Nd: YAG laser which extracts the third higher harmonics is called as a "3-time wave YAG laser", and the configuration of the laser oscillation means 4 in this case is principally almost similar to the configuration illustrated in FIG. 2. The optical system 5 is, as illustrated in FIG. 1, composed of two mirrors (galvanometer scanners) 5a and 5b which rotate toward different direction respectively for controlling the direction of the laser irradiation, a lens (Fθ lens) 5c for focusing the irradiated laser light, and so forth.

The laser irradiation apparatus 1 configured as described above provides a fully automatic operation for marking the key top with a character or symbol based on the process data created from the inputted data, by combining the three-dimensional position (position in each of X, Y, and Z axes) of the beam spot of the laser light under control of the operation of the optical system and so forth with the control of on-off timing of the laser light irradiation and output power.

Next, a description is provided about a key unit using a glass key top in the invention in the application. In FIGS. 3 through 9, the reference mark 10 illustrates a key unit, reference mark 11 illustrates a keypad which is transparent and made of a soft material such as silicone rubber and thermoplastic elastomer, reference mark 12 illustrates key tops made of transparent (colored or clear) glass, reference mark 13 illustrates transparent adhesive between the keypad 11 and the key top 12, reference mark 14 illustrates a laser light, reference mark 15 illustrates a character or symbol marked on the key top 11, reference mark 16 illustrates fine cracks formed on the surface or inside of the key top 12, reference mark 17 illustrates a dome switch, and reference mark 18 illustrates a printed circuit board, respectively. The key unit 10 is, as roughly illustrated in FIGS. 3 and 4, composed of the keypad 11 and many key tops 12, 12, . . . incorporated on the keypad 11. The keypad 11 and the key tops 12, 12, . . . are normally joined with a transparent adhesive 13.

Figure 3:
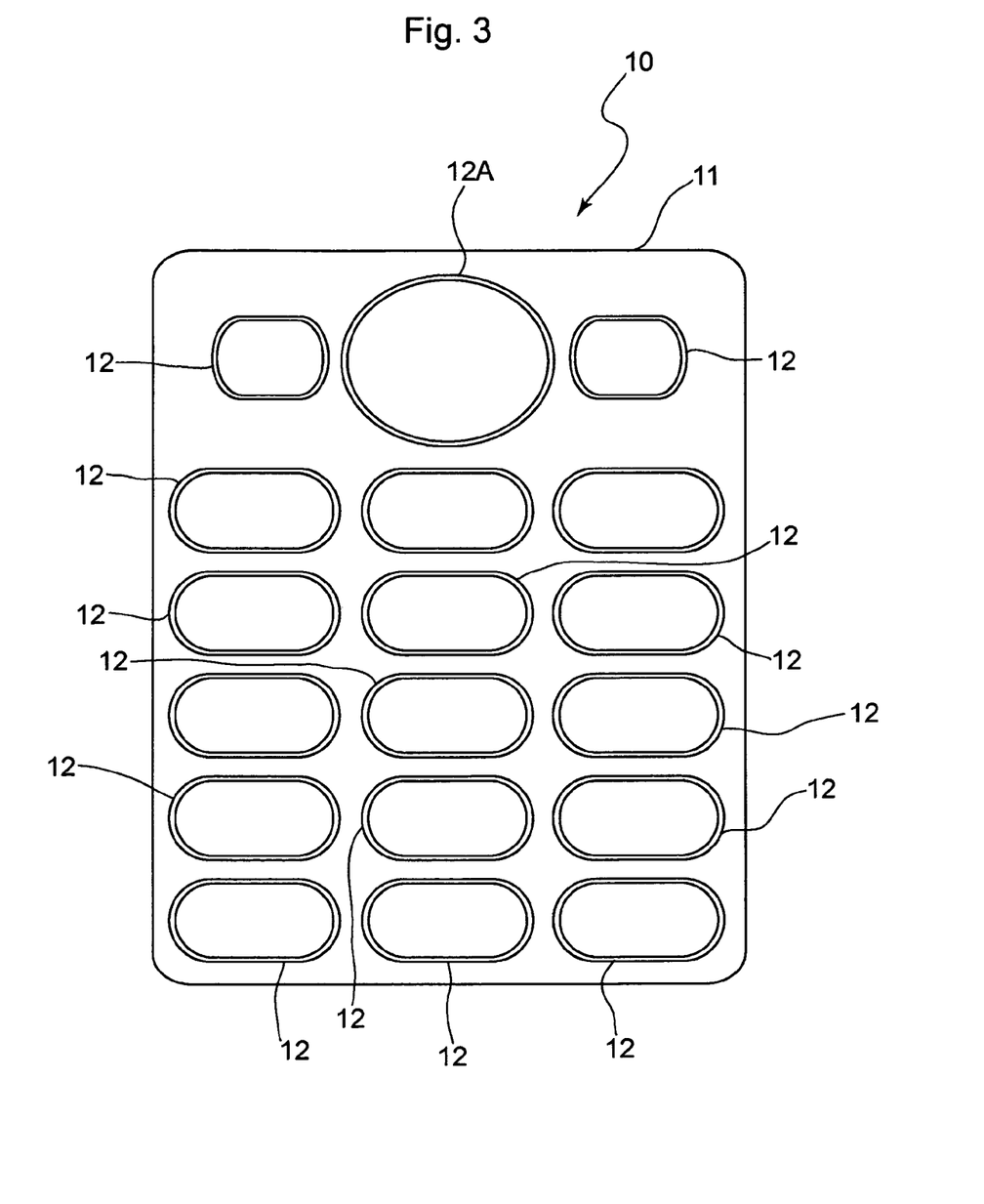
FIG. 3 is a plane view illustrating a key unit (before marking of characters and symbols) in the invention.
Figure 4:
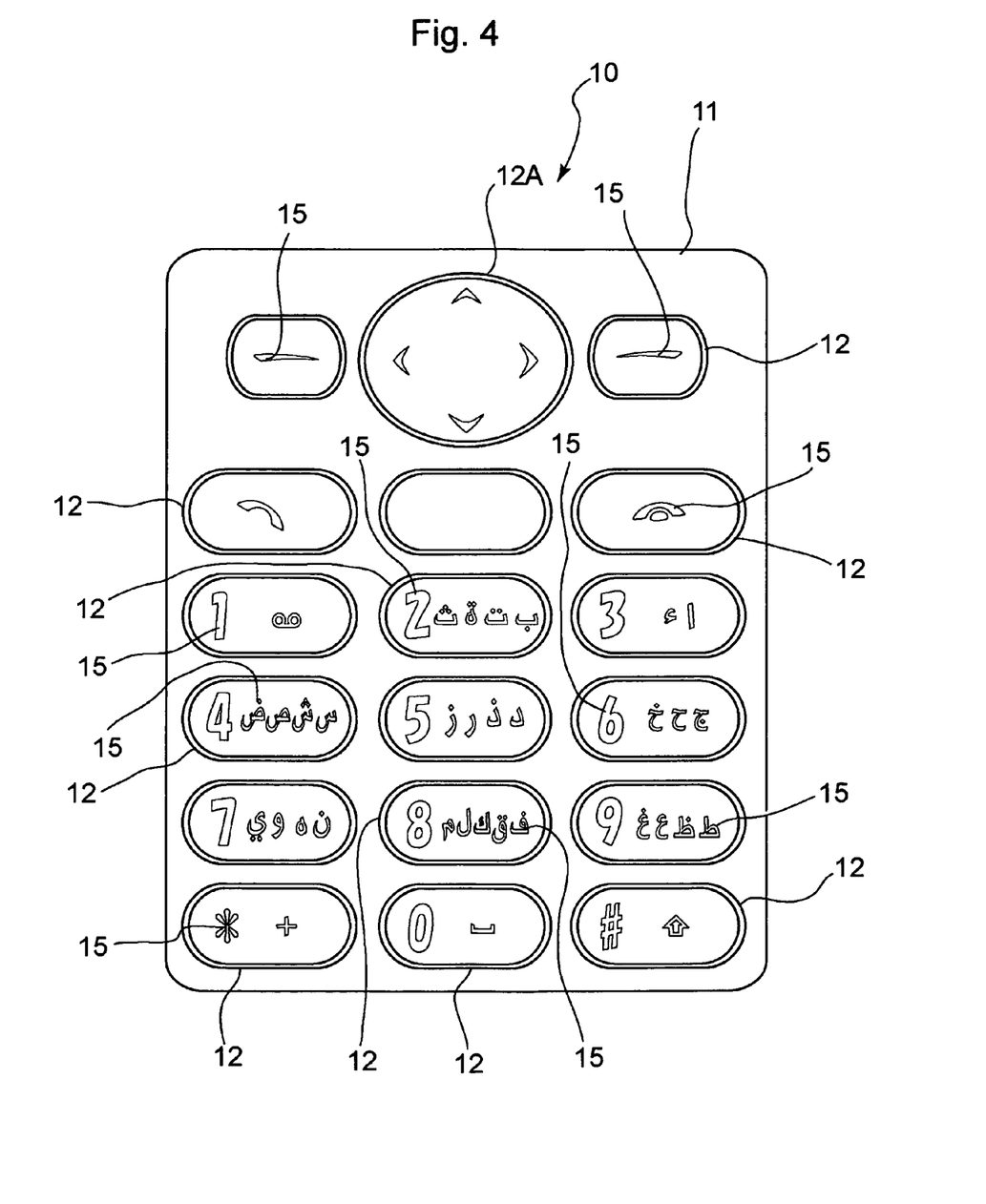
FIG. 4 is a plane view illustrating a key unit (after marking of characters and symbols) in the invention.
Figure 5:
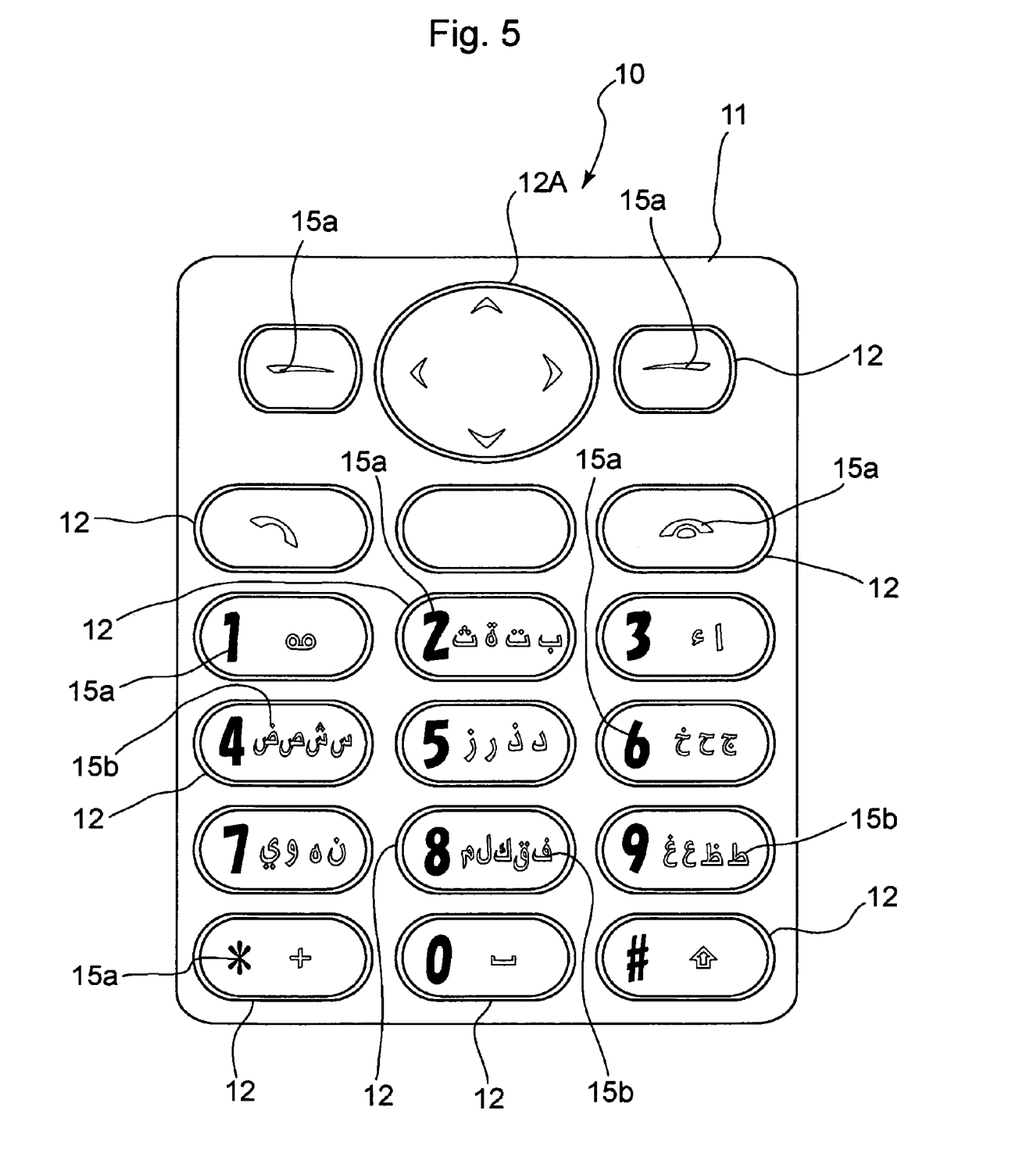
FIG. 5 is a plane view illustrating a key unit as an example of transformation (after marking of characters and symbols) in the invention.

FIG. 3 illustrates the key unit 10 before marking of characters and symbols, 15, 15 . . . , while FIG. 4 illustrates the key unit 10 after marking characters and symbols (as an example, those in Arabic language are illustrated) 15, 15 . . . . A key top 12A which is placed at the middle in the upper portion of the key unit 10 and is the largest in the outer shape among the key tops 12, 12, . . . is used as a so-called multidirectional key.

On the other surface of the keypad 11, that is, on the opposite side of the surface where the key tops 12, 12, are arranged, there are provided switch pressing projections (plungers) 11a, 11a, . . . according to the position of each key top respectively, as illustrated in FIGS. 6 through 9.

Each key top 12 is formed to a desired shape by injection molding, compression molding or the like out of clear and colorless glass, or colored and transparent glass. The glass material for forming the key top 12 is not necessarily limited by the substance, however it is desirable to use what is called low melting glass having glass transition temperature of 600° C. or below (a glass of which composition is typified by $PbO$—$SiO_2$—$B_2O_3$, $PbO$—$P_2O_5SnF_2$ or the like).

Under the lower surface of the key unit 10 thus configured, there are arranged dome switches (metal domes) 17, 17, . . . functioning as switch elements and a printed circuit board 20 having contact points not illustrated which contact the dome switches 17, 17, . . . so that key switches are configured at the position corresponding to each key.

Figure 7:
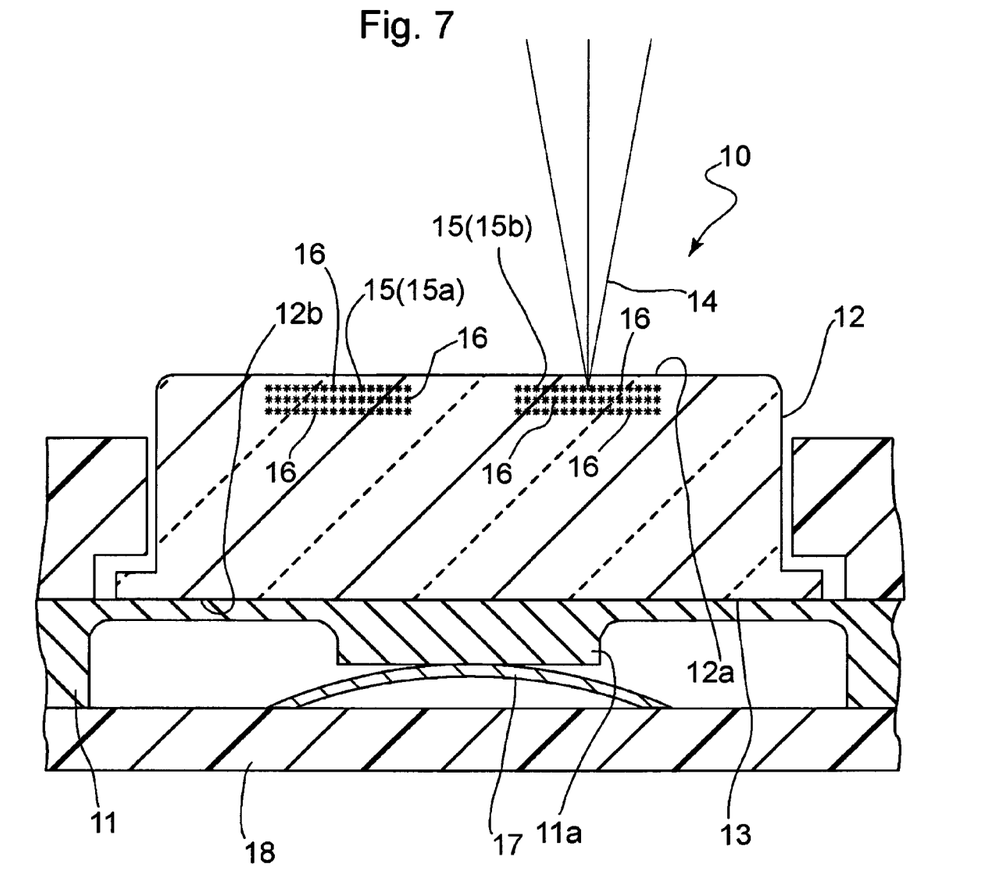
FIG. 7 is a vertical cross-sectional view which enlarges and illustrates the status when a laser light is irradiated to an upper layer inside the key top for marking.
Figure 8:
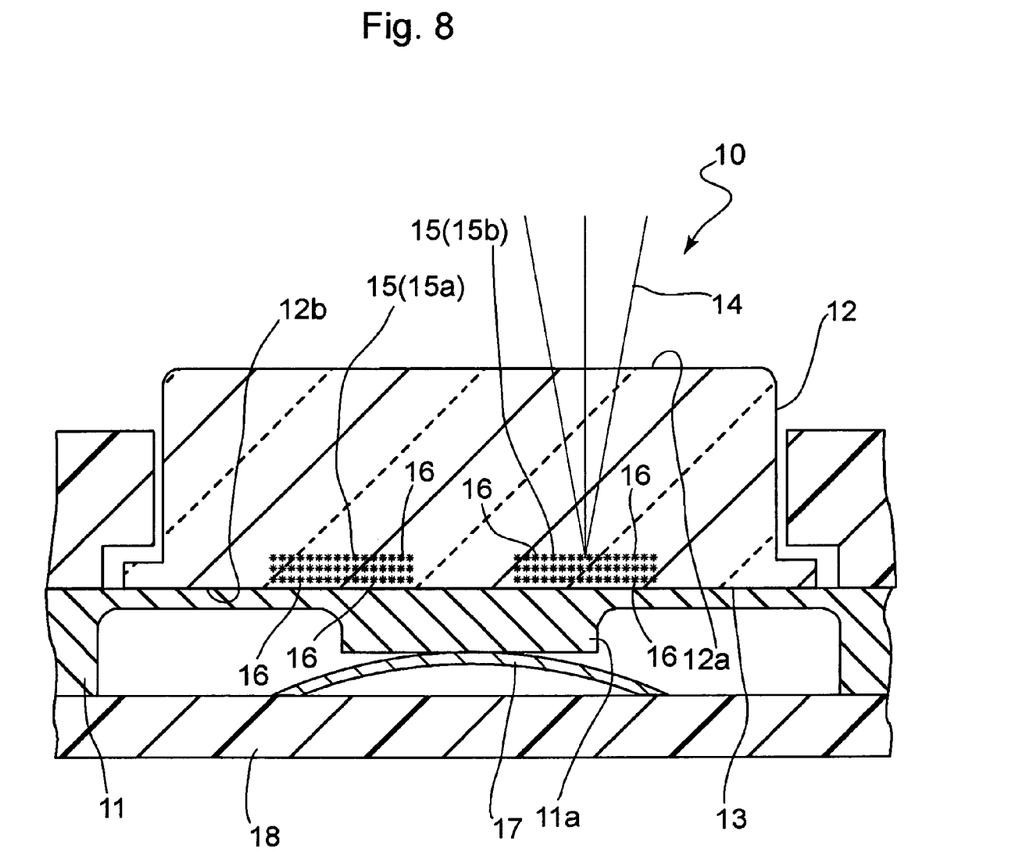
FIG. 8 is a vertical cross-sectional view which enlarges and illustrates the status when a laser light is irradiated to a lower layer inside the key top for marking.
Figure 9:
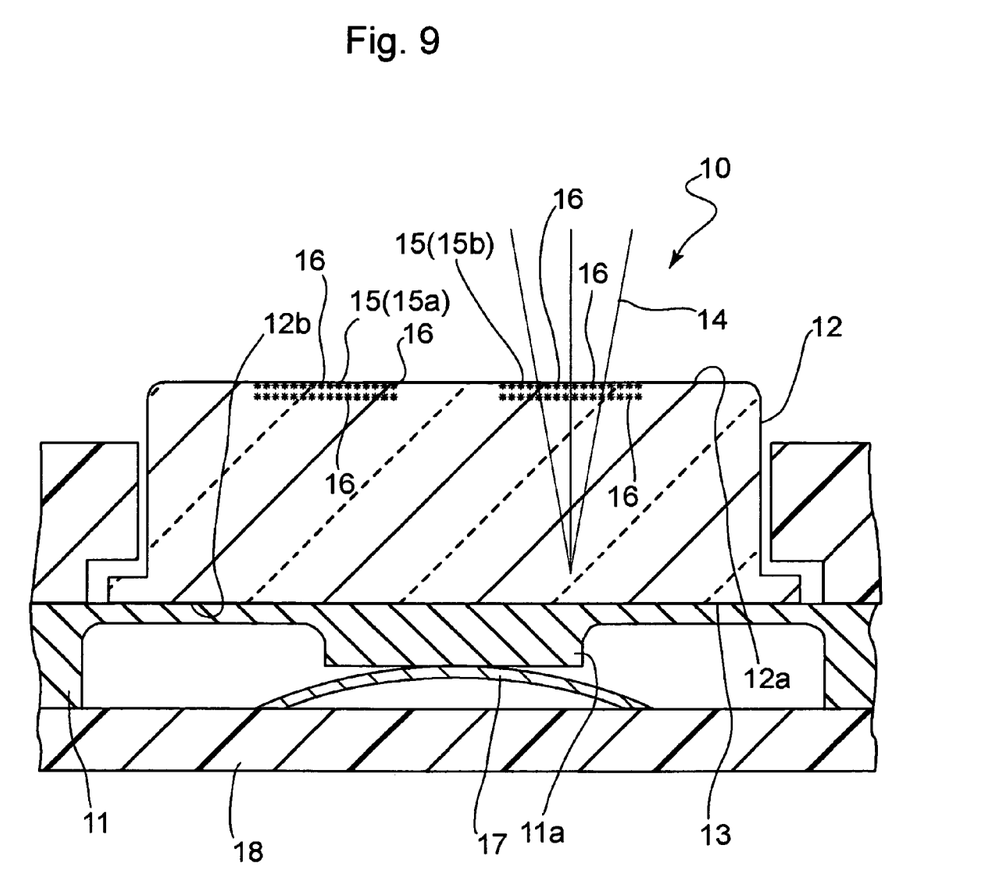
FIG. 9 is a vertical cross-sectional view which enlarges and illustrates the status when a laser light is irradiated to the surface of the key top for marking.

FIGS. 6 to 9 illustrate a part of the key unit 10 after marking of characters and symbols 15, 15, . . . by the laser irradiation apparatus 1 in an enlarged vertical sectional view. Each of following drawings illustrates an example of forming plenty of fine cracks 16, 16, . . . for marking characters and symbols 15, 15, . . . at an intermediate part (middle layer) in the way to thickness of the key top 12 in FIG. 6, at the top part (adjacent to the surface 12a) of the key top 12 in FIG. 7, at the bottom part (adjacent to the reverse 12b) of the key top 12 in FIG. 8, and on the surface 12a of the key top 12 in FIG. 9, respectively. Plenty of cracks 16, 16, . . . are formed in several tiers in the way to the thickness of the key top, and the character or symbol 15 is configured by this three-dimensional set of the cracks. In addition, in the case where the character or symbol 15 is formed on the surface 12a of the key top 12 as illustrated in FIG. 9, fine concavity and convexity are formed in the shape of the character or symbol 15 on the surface 12a, or ground glassy grooves, that is, texture processed grooves are formed on the surface 12a by the set of fine cracks 16, 16, . . . , and are thereby engraved into the shape of the character or symbol 15.

What is used in the present embodiment as the laser beam 14 is the aforementioned green laser (532 nm wavelength). At first, the laser beam 14 is focused on the lowest tier in the area (surface, top layer, middle layer, or bottom layer) of the key top 12 which should be marked with the character or symbol 15 and the spot diameter of the laser beam 14 is narrowed to 30 μm or below. And then, based on the 3-dimensional process data of the character or symbol to be engraved, the laser beam is irradiated, for example, scanning as if a spiral is drawn within the plane shape of the character or symbol 15, along the plane shape of the character or symbol 15 at the designated position. If the irradiation along the plane shape on the lowest tier is finished, the focal point is displaced a little upward and the laser beam is irradiated in the same way as described above.

Figure 6:
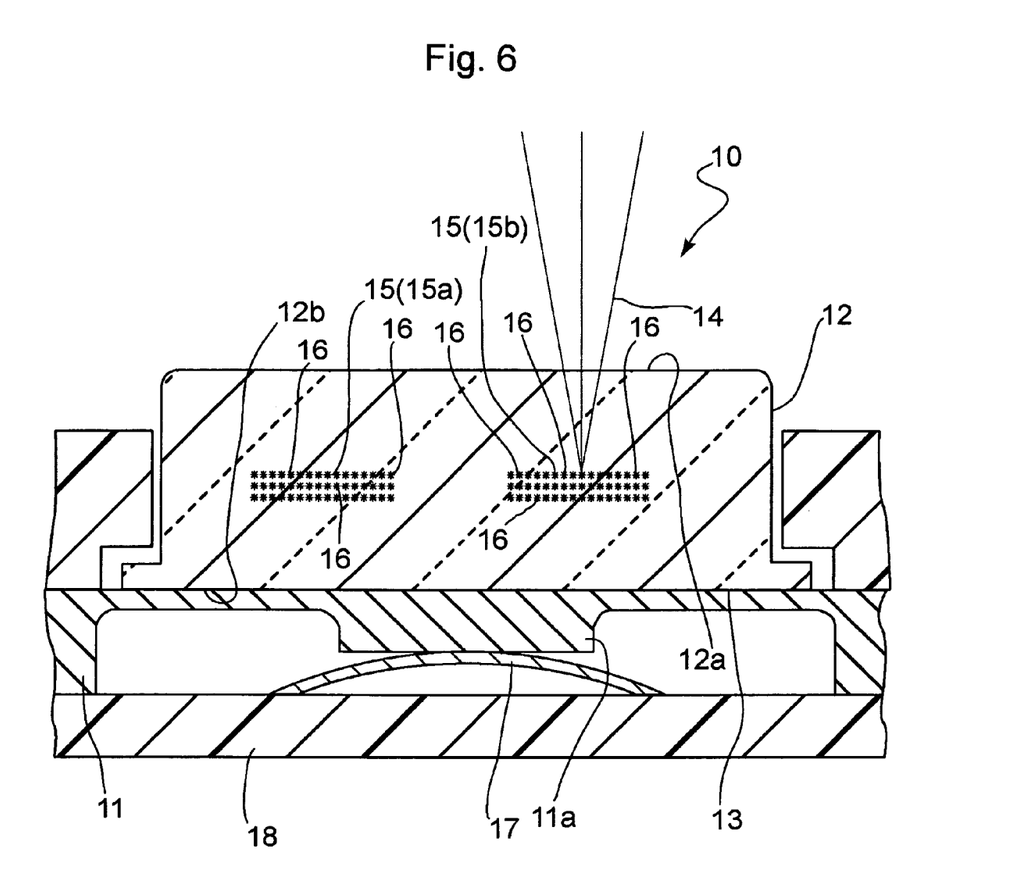
FIG. 6 is a vertical cross-sectional view which enlarges and illustrates the status when a laser light is irradiated to a intermediate layer inside the key top for marking.

Thus, the laser beam is repeatedly irradiated by the prescribed number of tiers with the focal point of the laser beam 14 displaced upward, and as a result, a three-dimensional set of fine cracks (namely luminescent spots) 16, 16, . . . representing the objected character or symbol 15 is formed. If looking from the side, as illustrated in FIGS. 6 to 8, the characters and symbols 15, 15, . . . are formed at the upper position, intermediate position, lower position, or other desired position so as to float in the glass medium of the key tops 12, 12, . . . or as illustrated in FIG. 9, fine concavity and convexity are formed in the shape of the character or symbol 15 on the surface 12a, or ground glassy grooves, that is, grooves engraved in the state of texture process are formed on the surface 12a. And, looking down in plane wise from the top of the key unit 10 (surface side of the key top 10), as illustrated in FIG. 4, the characters or symbols 15, 15, . . . are presented on the key tops 12, 12, . . . .

Therefore, light is dispersed by the set of fine cracks 16, 16, . . . on each key top 12, and the character or symbol 15 can be recognized distinctly as a three-dimensional set of luminescent spot.

And yet, as for the key unit 10, all key tops 12A, 12, 12, . . . should not necessarily be limited to the key tops made of glass. For example, it is possible to use the glass key tops 12, 12, . . . only for keys for entering numbers (what is called numeric keyboards), while as for key tops 12A, 12, 12 . . . of other keys including multidirectional keys, it is possible to use, for example, the key tops that are made of synthetic resin such as PC (polycarbonate) or the like and a plurality of layers are formed by printing or painting on the surface thereof, which are marked with the characters or symbols 15, 15, . . . by a laser beam. In this case, even if the materials of the key tops are different, means for marking the characters or symbols 15, 15, . . . is fundamentally the same. Therefore, it is possible to mark all the key tops 12A, 12, 12, . . . in the same manufacturing process by automatically doing control such as power adjustment operation in the laser irradiation apparatus 1 according to the kind of key tops 12A, 12, 12, . . . .

Finally, a description is provided about a manufacturing method of the key unit 10 in the invention.

Figure 10:
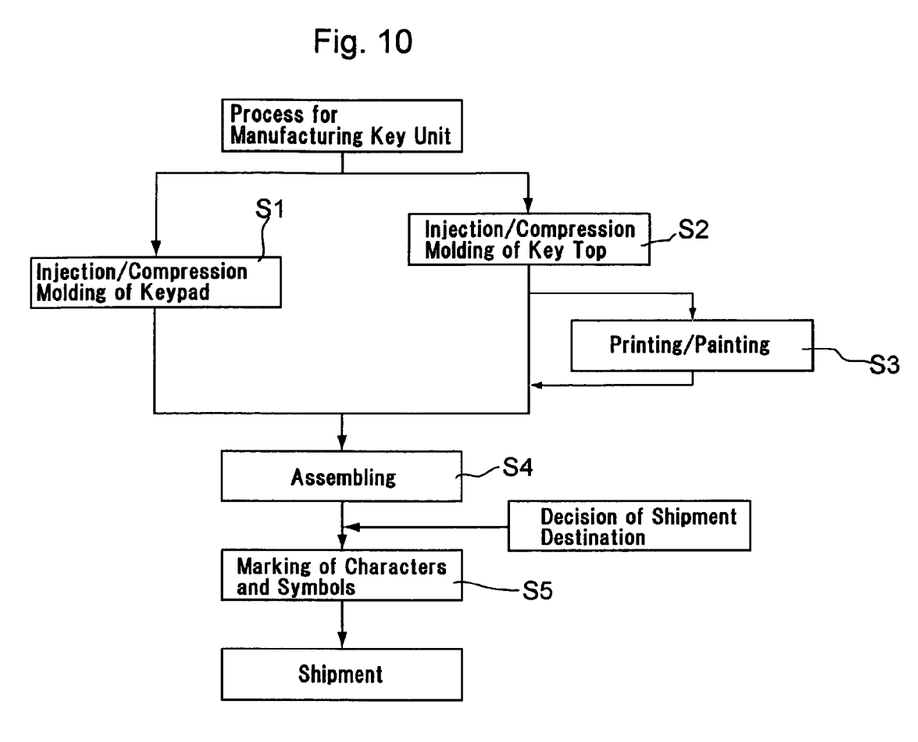
FIG. 10 is a block diagram illustrating a manufacturing process in the method for manufacturing key units according to the invention.

The keypad 11 and the key tops 12, 12, . . . are separately formed, as illustrated in FIG. 10, by an appropriate forming method such as injection molding, compression molding or the like (Process S1, Process S2). Then, the key tops 12, 12, . . . are joined with the transparent adhesive (Process S4). The manufacturing process of the key unit 10 is temporarily discontinued at the time when the Process S4 is completed. In addition, in the case where key tops not made of glass, for example, the key tops manufactured so that characters or symbols can be marked on the layers formed by printing or painting on the surface by a laser light are mixed in the key unit 10, these key tops are printed or pained on the surface and so forth in the Process S3.

Then, when the shipment destination of the key unit 10 is fixed, and the characters and symbols are determined according to the language used, the characters and symbols to all the key tops in the key unit 10 are marked by the laser irradiation apparatus 1 (Process 5). After marking of the key tops 12, 12, . . . is completed, the key unit 10 is shipped solely or incorporated into a predetermined mobile equipment.

In case of mobile phones, the characters and symbols 15, 15, . . . marked on the key tops 12, 12, . . . generally include characters like numbers (basic characters) 15a, 15a, independent from the language, and characters (language dependant characters) dependent on the language, all together. Therefore, even in case of the glass key top 12, it is possible, as an example of transformation illustrated in FIG. 5, to form only the above-mentioned basic characters 15a in advance by printing or painting on the reverse side 12b, the plane of the side which is joined to the keypad 11 with adhesive. In this case, only the remaining language dependent characters 15b are marked in the Process S5.

In the key unit 10 described in the above embodiment, it is described that the key tops 12, 12, . . . are all made of glass and are marked by a laser beam, however, the invention is not limited to this description, and at least one of key tops 12 may be made of glass and be marked with a character or symbol 15 by the above-mentioned marking method.

Further, as for the position of forming the above-mentioned character or symbol 15, on which portion, that is, the surface, top layer, middle layer, or bottom layer of the key top 12, the character or symbol should be formed can easily be responded by just displacing the focal position of the laser beam 14 in the direction of the thickness of the key top 12. Therefore, a single key unit 10 may include key tops that have different positions of forming characters or symbols 15, for example, key tops wherein the positions of forming characters or symbols are changed according to the function of the keys, all together.

INDUSTRIAL APPLICABILITY

The glass key top according to the invention as claimed in claim 1 is in a state that a character or symbol is directly engraved on the surface of the glass medium, or in a state that a character or symbol is formed inside of the glass medium including the upper position adjacent to the surface, intermediate position, lower position, or other desired position and a character or symbol floats in the glass medium. Therefore, the character or symbol marked can be provided perfect wear resistance, and especially in the latter case, is immune from an unsanitary state in which a character or symbol marked is easily soiled with hands. Furthermore, in the case where a character or symbol is formed inside, the character or symbol can be seen with a lens effect in the floating state in the glass medium. Therefore, a fresh visual effect can be obtained.

According to the glass key top as claimed in claim 2, there can be provided a glass key top which is efficiently manufactured and excels in wear resistance without breaking the glass thereof.

According to the marking method as claimed in claim 1, there can be provided marking of a character or symbol having perfect wear resistance, since the character or symbol can be marked in a state that the character or symbol is engraved on the surface of the glass medium or in a state that the character or symbol is formed inside, and floats in the glass medium.

According to the method for manufacturing the key unit as claimed in claim 5, since it is possible to mark necessary characters or symbols ex post facto on the glass keys finished with no mark, in a single process, it enables to establish a new method for manufacturing a key unit which has perfect wear resistance and excels in nonconventional fanciness. Furthermore, according to this new manufacturing method, it enables to reduce the time from decision of shipping destination to the product shipment to a large extent and improve user services.

According to the inventions claimed in claims 4 and 6, when laser marking of a character or symbol is done to the glass key, it is possible to promptly form fine cracks and to mark, while maintaining the temperature of the portions other than the irradiation spot at the permissible temperature or below by narrowing the diameter of the beam spot and increasing the density of the light energy at the irradiation spot.

The invention claimed is:

1. A key top made of transparent glass used for a key unit of a mobile phone and so forth characterized in that a character or symbol is formed by a set of fine cracks formed on the surface of a glass medium and/or the character or symbol is marked by a set of fine cracks formed at the upper position, intermediate position, lower position, or other desired position inside the glass medium.

2. The key top according to claim 1 characterized in that a laser light belonging to a near-infrared band having a wavelength of about 1100 nm or below, visible light band, or ultraviolet light band is intermittently irradiated while focused on the desired position on the surface or inside of the key top, so that plenty of fine cracks are formed as a set in the glass medium to mark a character or symbol thereby.

3. A key top marking method for marking the surface or inside of the key top with a character or symbol by irradiating laser to the transparent glass key top characterized in that a laser light belonging to a near-infrared band having a wavelength of about 1100 nm or below, visible light band, or ultraviolet light band is intermittently irradiated while focused on the desired position on the surface or inside of the key top so that plenty of fine cracks are formed as a set to represent a character or symbol.

4. The key top marking method according to claim 3 characterized in that either of the second through forth higher harmonics of a solid-state laser doped with Nd (Neodymium) ion is applied as said laser light.

5. A method for manufacturing a key unit characterized in that transparent glass key tops before marking are incorporated into a key unit;

the manufacturing work is temporarily discontinued in a state of completion of all the processes except for marking into said key unit;

pending the determination of the content of a character or symbol necessary for said key unit, a laser light belonging to a near-infrared band having a wavelength of about 1100 nm or below, visible light band or ultraviolet light band is intermittently irradiated while focused on the desired position on the surface or inside of the key top, so that plenty of fine cracks are formed as a set on the surface or inside of the glass medium, and thereby marking for representing the character or symbol is performed to complete the key unit.

6. The method for manufacturing a key unit according to claim 5 characterized in that either of the second through forth higher harmonics of a solid-state laser doped with Nd (Neodymium) ion is applied as said laser light.

* * * * *